United States Patent
Grunwald et al.

(10) Patent No.: US 11,835,372 B2
(45) Date of Patent: *Dec. 5, 2023

(54) CLAMP-ON ULTRASONIC TRANSDUCER ARRANGEMENT INDEPENDENT OF MEASURING TUBE DIAMETER AT A MEASURING POINT AND METHOD FOR COMMISSIONING THE SAME

(71) Applicant: Endress+Hauser Flowtec AG, Reinach (CH)

(72) Inventors: Sascha Grunwald, Steinen (DE); Oliver Brumberg, Rheinfelden (DE); Alexander Murray, Basel (CH); Andreas Berger, Erschwil (CH); Achim Wiest, Weil am Rhein (DE)

(73) Assignee: Endress+Hauser Flowtec AG, Reinach (CH)

( * ) Notice: Subject to any disclaimer, the term of this patent is extended or adjusted under 35 U.S.C. 154(b) by 307 days.

This patent is subject to a terminal disclaimer.

(21) Appl. No.: 17/413,266

(22) PCT Filed: Nov. 21, 2019

(86) PCT No.: PCT/EP2019/082015
§ 371 (c)(1),
(2) Date: Jun. 11, 2021

(87) PCT Pub. No.: WO2020/120091
PCT Pub. Date: Jun. 18, 2020

(65) Prior Publication Data
US 2022/0049983 A1    Feb. 17, 2022

(30) Foreign Application Priority Data

Dec. 13, 2018 (DE) .................... 10 2018 132 053.1

(51) Int. Cl.
*G01F 1/66*     (2022.01)
*G01F 1/667*    (2022.01)

(52) U.S. Cl.
CPC .................................. *G01F 1/667* (2013.01)

(58) Field of Classification Search
None
See application file for complete search history.

(56) References Cited

U.S. PATENT DOCUMENTS 5,105,666 A * 4/1992 Steinacher ............. G01F 1/667
73/861.28
2010/0134782 A1* 6/2010 Roberts .................. G01B 11/18
356/32

(Continued)

FOREIGN PATENT DOCUMENTS

DE         60212717 T2      6/2007
DE      102008029772 A1    12/2009

(Continued)

*Primary Examiner* — Harshad R Patel
(74) *Attorney, Agent, or Firm* — Christopher R. Powers; Endress+Hauser (USA) Holding, Inc.

(57) ABSTRACT

The present disclosure relates to an ultrasonic transducer arrangement of a clamp-on ultrasonic, flow measuring point having a plurality of clamp-on ultrasonic transducers, wherein the arrangement is configured to be applied on measuring tubes of various diameters, without necessitating new orienting of the ultrasonic transducers of the ultrasonic transducer arrangement.

18 Claims, 7 Drawing Sheets

(56) References Cited

U.S. PATENT DOCUMENTS

| | | | |
|---|---|---|---|
| 2011/0094309 A1* | 4/2011 | Berger | G01F 1/668 73/861.28 |
| 2016/0025684 A1* | 1/2016 | Deneuville | G01N 29/262 73/622 |
| 2016/0327419 A1 | 11/2016 | Hellevang et al. | |

FOREIGN PATENT DOCUMENTS

| | | |
|---|---|---|
| EP | 2891866 A1 | 7/2015 |
| WO | 9517650 A1 | 6/1995 |

* cited by examiner

CLAMP-ON ULTRASONIC TRANSDUCER ARRANGEMENT INDEPENDENT OF MEASURING TUBE DIAMETER AT A MEASURING POINT AND METHOD FOR COMMISSIONING THE SAME

CROSS-REFERENCE TO RELATED APPLICATIONS

The present application is related to and claims the priority benefit of German Patent Application No. 10 2018 132 053.1, filed on Dec. 13, 2018, and International Patent Application No. PCT/EP2019/082015, filed on Nov. 21, 2019, the entire contents of which are incorporated herein by reference.

TECHNICAL FIELD

The present disclosure relates to clamp-on ultrasonic, flow measuring transducers based on the travel time difference principle and methods for commissioning the same for measuring operation.

BACKGROUND

Clamp-on ultrasonic, flow measuring points are applied, instead of inline flow measuring points with ultrasonic transducers integrated into a measuring tube, when an installation of a measuring tube of an inline flow measuring point is cumbersome or impossible. Clamp-on ultrasonic, flow measuring points are significantly easier to set up and can be installed on different measuring tubes. They have, however, the disadvantage that ultrasonic transducers of such a measuring point as it comes from the factory can, at most, be only roughly tuned to one another.

The state of the art shows ultrasound transducer arrangements of such flow measuring points, in the case of which the ultrasonic transducers are mounted shiftably relative to one another, in order to permit a fine tuning. This requires, however, technical knowledge and also a certain time consumed. A detouring around this problem is presented in DE102008029772A1, in the case of which two groups, in each case, of a plurality of ultrasonic transducers are placed on an outside of a measuring tube, wherein adjoining ultrasonic transducers of each group have small separations from one another, wherein these separations are slightly different between the groups. In this way, it is achieved that due to a plurality of ultrasonic transducers in many cases a ultrasonic transducer pair connected by an ultrasonic signal path exists and, thus, small changes of process parameters, such as, for example, velocity of sound can be compensated by changing the ultrasonic transducer pair.

SUMMARY

An object of the invention is to provide an ultrasonic transducer arrangement for a clamp-on, ultrasonic, flow measuring point and a clamp-on ultrasonic, flow measuring point, in the case of which the ultrasonic transducer arrangement is largely independent of measuring tube diameter.

The object is achieved by an ultrasonic transducer arrangement a clamp-on ultrasonic, flow measuring point, and a method for commissioning the ultrasonic, flow measuring point into operation according to the present disclosure.

An ultrasonic transducer arrangement of the invention for a clamp-on ultrasonic, flow measuring point based on the travel time difference principle comprises:

a plurality of ultrasonic transducers, which are adapted to be arranged on an outside of a measuring tube of the clamp-on flow measuring point, wherein the ultrasonic transducers have, in each case, at least one transducer element for producing and/or receiving ultrasonic signals as well as a coupling element, wherein the coupling element has a first contact area and a second contact area, wherein the transducer element is arranged on the first contact area, and wherein the ultrasonic transducer is adapted by means of the second contact area to be contacted with the measuring tube, wherein the ultrasonic transducers are adapted to radiate ultrasonic signals into the measuring tube and/or to receive ultrasonic signals emerging from the measuring tube, wherein the second contact areas have, in each case, a normal, wherein the normals define a plane, in which ultrasonic signal paths of the ultrasonic signals extend, wherein first ultrasonic transducers define first ultrasonic signal paths extending in parallel with one another, and wherein second ultrasonic transducers define second ultrasonic signal paths extending in parallel with one another, wherein the ultrasonic signal paths extend in the plane, wherein the ultrasonic signal paths of the first ultrasonic transducers as well as the second ultrasonic transducers extend in the coupling element, in each case, inclined to the second contact area, wherein a direction of the first ultrasonic signal paths and a direction of the second ultrasonic signal paths are mirror symmetric to a normal, wherein first ultrasonic signal paths define with second ultrasonic signal paths intersection points in the plane, wherein the intersection points sit at parallels, which extend in the plane perpendicularly to the normals, wherein a first group of associated ultrasonic transducers has exclusively first ultrasonic transducers of a first number, and wherein a second group of associated ultrasonic transducers has exclusively second ultrasonic transducers of a second number, wherein adjoining ultrasonic transducers of the first group have in the direction of the parallels, in each case, first separations $A1$ from one another, and wherein adjoining ultrasonic transducers of the second group have in the direction of the parallels, in each case, second separations $A2$ from one another, wherein the first separation and the second separation are unequal, characterized in that $2*A1 \geq A2 \geq 1.125*A1$, and, especially, $1.75*A1 \geq A2 \geq 1.16*A1$, and preferably $1.6*A1 \geq A2 \geq 1.25*A1$.

Associated means here that between ultrasonic transducers of a group no additional ultrasonic transducers are arranged.

In an embodiment a relationship between first separation $A1$ and second separation $A2$ conforms, or especially corresponds, to the following equation:

$(a+1)*A3 = a*A2$ with $b > a > 1$, a is a natural number and b is an upper value for a range of a and is less than 9, and, especially, less than 7, and preferably less than 5.

Advantageously, the first number and/or the second number is greater than a.

In an embodiment, the ultrasonic transducers have, in each case, a longitudinal axis, wherein the longitudinal axes have, in each case, an interior angle α relative to the corresponding second contact area, wherein the ultrasonic signal paths extend in the coupling elements in the direction of the longitudinal axes, wherein the transducer elements have a radial extent (rA), wherein $$rA > 3/(8*a)*A1*\cos(\alpha),$$

and, especially, $$rA > 1/(4*a)*A1*\cos(\alpha).$$

In an embodiment, the ultrasonic transducer arrangement includes at least a third group of ultrasonic transducers having at least one, first ultrasonic transducer and/or at least one, second ultrasonic transducer, wherein at least one intersection point formed with a first ultrasonic transducer of the third group and/or a second ultrasonic transducer of the third group supplements a greatest cardinality, first amount of equidistant parallels.

The greatest cardinality, first amount is characterized in that adjoining parallels belonging to the greatest cardinality amount have, in each case, a same separation from one another and that the amount compared with other amounts of equidistant parallels has the most parallels.

In an embodiment, the ultrasonic transducer arrangement includes at least a third ultrasonic transducer, which has a signal path, which extends perpendicularly to the second contact area.

In an embodiment, the arrangement includes a support body for holding the ultrasonic transducers.

In an embodiment, the ultrasonic transducers are held, in each case, individually in the support body.

A clamp-on ultrasonic, flow measuring point of the invention for measuring a flow velocity of a medium flowing through a measuring tube comprises:

the measuring tube for conveying a medium and having a measuring tube axis, an ultrasonic transducer arrangement of the invention, wherein the ultrasonic transducer arrangement is oriented in parallel with the measuring tube axis, an electronic measuring—and operating circuit for operating the ultrasonic transducer as well as for ascertaining and providing measured values of flow velocity.

In an embodiment, the clamp-on ultrasonic, flow measuring point includes a curvature sensor for determining an outer diameter of the measuring tube, wherein the curvature sensor has a separation sensor and a spacer, wherein the spacer has a central region and two ends adjoining the central region, wherein the ends are bounded from the central region by a bend or an angle, wherein the spacer is adapted by means of the ends to be contacted with the measuring tube, wherein the central region is adapted to be spaced from the measuring tube, and wherein a cross section, or longitudinal section, through the spacer through the two ends is adapted to extend in parallel with a measuring tube cross section, wherein the separation sensor is arranged on the spacer in the central region, wherein the electronic measuring/operating circuit is adapted to operate the separation sensor.

In an embodiment, the separation sensor is an optical or acoustic, separation sensor.

In a method of the invention for commissioning the clamp-on ultrasonic, flow measuring point into operation, a plurality of first ultrasonic transducers/a plurality of second ultrasonic transducers transmit, simultaneously or offset in time, in each case, an ultrasonic signal, which ultrasonic signals are received by second ultrasonic transducers/first ultrasonic transducers, wherein the electronic measuring/operating circuit determines based on signal strength and/or signal/noise ratio of the received ultrasonic signals at least one ultrasonic transducer pair to be used for a measurement operation.

In an embodiment, the ultrasonic signals are quasi-continuous and differ in frequency, or wherein the ultrasonic signals are pulsed and differ in the following feature:

center frequency of a frequency spectrum.

In an embodiment, a medium is conveyed through the measuring tube, wherein in the case of received ultrasonic signals ultrasonic signal portions are examined for presence of a travel time difference, wherein ultrasonic signal portions without travel time difference are excluded in determining an ultrasonic transducer pair to be used.

In a method of the invention, the third ultrasonic transducer is caused to transmit and to receive an ultrasonic signal, wherein the electronic measuring/operating circuit determines an outer diameter and/or inner diameter based on at least one signal characteristic of the received ultrasonic signal, wherein a usable signal characteristic is, for example: travel time.

In a method of the invention, the electronic measuring/operating circuit determines an outer diameter by means of the curvature sensor.

BRIEF DESCRIPTION OF THE DRAWINGS

The invention will now be described based on examples of embodiments presented in the appended drawing, the figures of which show as follows.

DETAILED DESCRIPTION

Figure 1:
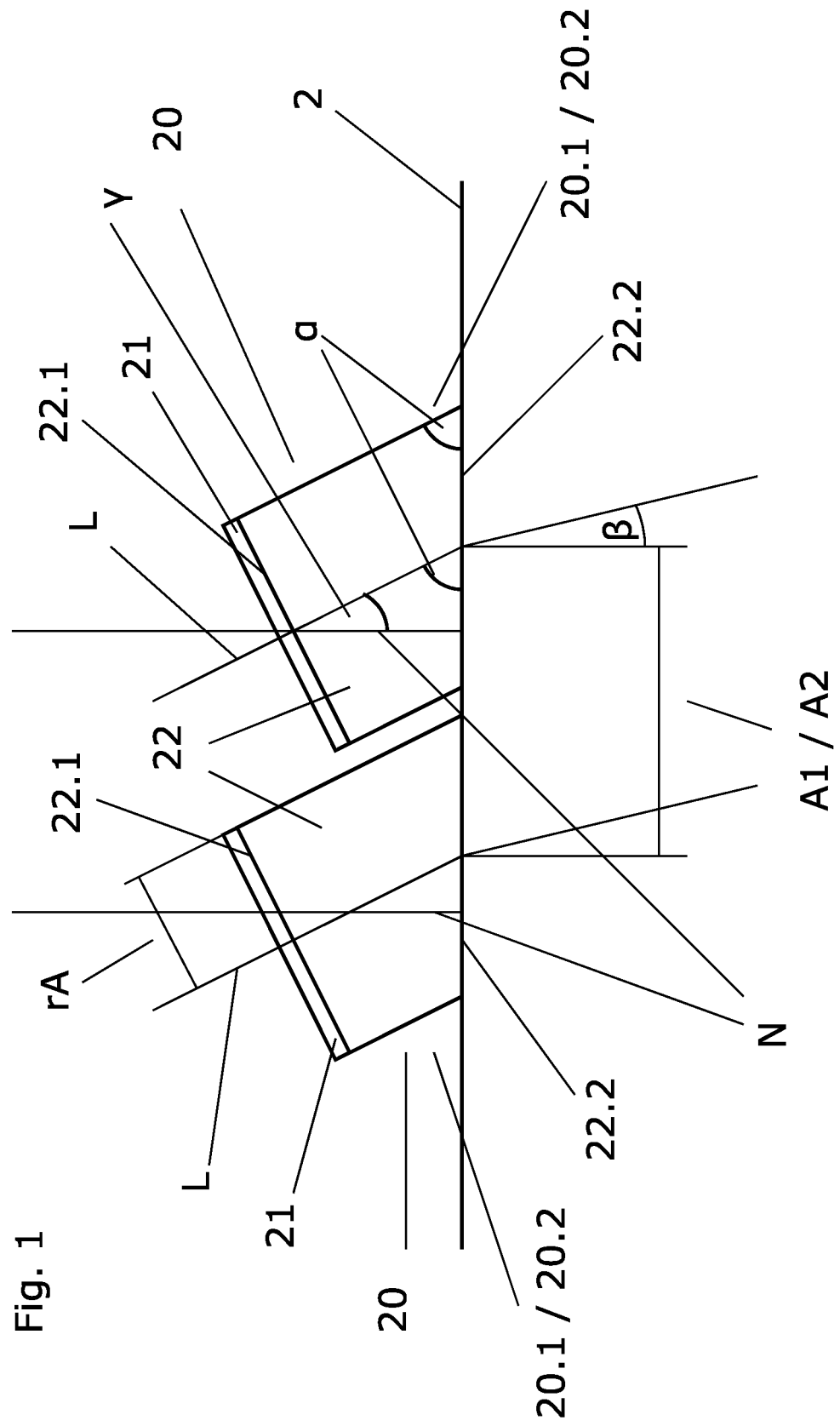
FIG. 1 shows two ultrasonic transducers of an arrangement of the present disclosure.

FIG. 1 shows a schematic construction of examples of ultrasonic transducers 20 and a part of an arrangement of the invention comprising two, first ultrasonic transducers 20.1 and two, second ultrasonic transducers 20.2, which are arranged on an outside of a measuring tube 2. An ultrasonic transducer includes, in each case, at least one transducer element 21, preferably a piezoelectric transducer element, and a coupling element 22, wherein the transducer element is arranged on a first contact area 22.1 of the coupling element, and wherein the coupling element is acoustically and mechanically coupled with the measuring tube via a second contact area 22.2. The coupling element has a longitudinal axis L, along which travel ultrasonic signals produced by the transducer element 21 or received via the contact area 22.2. The transducer element is preferably disc shaped and has a radial extent rA. The radial extent of the transducer element does not necessarily correspond to a radial extent of the coupling element, such that the showing in FIG. 1 simply facilitates the drawing. The longitudinal axis has relative to a normal N of the second contact area an angle γ, so that ultrasonic signals are coupled inclined into the measuring tube. In the measuring tube, an ultrasonic signal path has an angle β to the normal, which angle β, in general differs from the angle γ, when a velocity of sound in the coupling element differs from a velocity of sound in the medium. Neighboring first ultrasonic transducers 20.1 have a first separation A1 from one another, Correspondingly, adjoining second ultrasonic transducers have a second separation A2 from one another.

Typical values for the angle γ are 30° to 45°, depending on the materials utilized for the coupling element and measuring tube and the medium flowing through the measuring tube.

Figure 2:
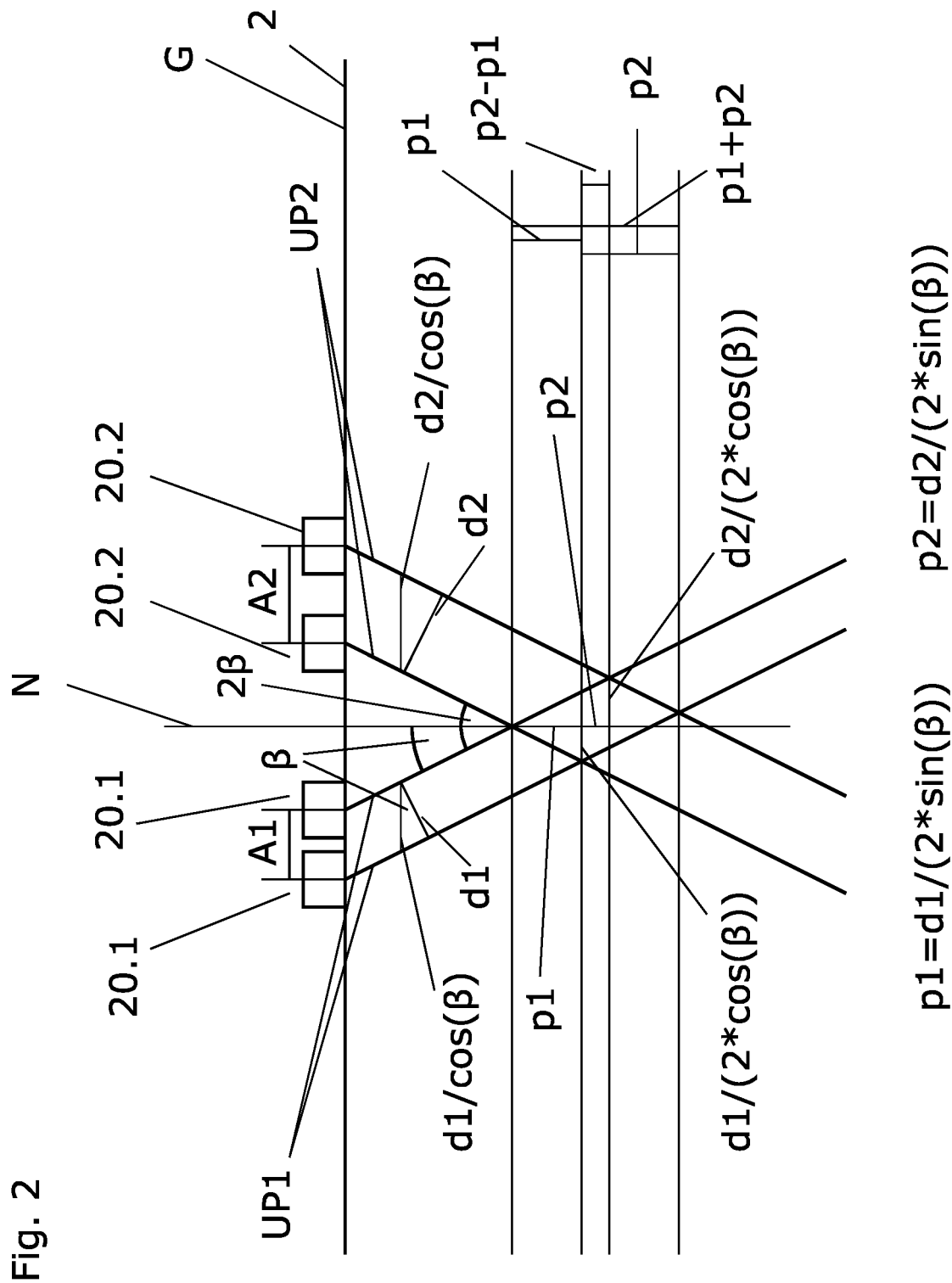
FIG. 2 shows geometric relationships of an arrangement of the present disclosure for ultrasonic transducers.

FIG. 2 shows mutually parallel, first ultrasonic signal paths UP1 and mutually parallel, second ultrasonic signal paths UP2 in the measuring tube 2, which emanate from two, first ultrasonic transducers 20.1 and two, second ultrasonic transducers 20.2 and extend in a plane, wherein each pair of a first ultrasonic signal path and a second ultrasonic signal path extend mirror symmetrically to a normal N of a second contact area. The ultrasonic signal paths cross and define a network of intersection points, which lie in the plane. Intersection points on a first ultrasonic signal path UP1 have a separation p2=d2/(2*sin(β)) projected onto a normal N, wherein d2 equals the separation of neighboring second ultrasonic signal paths UP2. Correspondingly, intersection points on a second ultrasonic signal path UP2 have a separation p1=d1/(2*sin(β)) projected onto the normal N, wherein d1 equals the separation of neighboring first ultrasonic signal paths UP1. A minimum separation projected onto the normal for two intersection points amounts to p2−p1.

The numbers of the ultrasonic transducers, their arrangements relative to one another as well as the selected angles are not to be construed as limiting and are shown purely for purposes of illustration. A thickness of the measuring tube 2, neglected in this case, influences a sound entrance point into the medium relative to the coupling element. One skilled in the art will take this into consideration, as the case may be.

Figure 3:
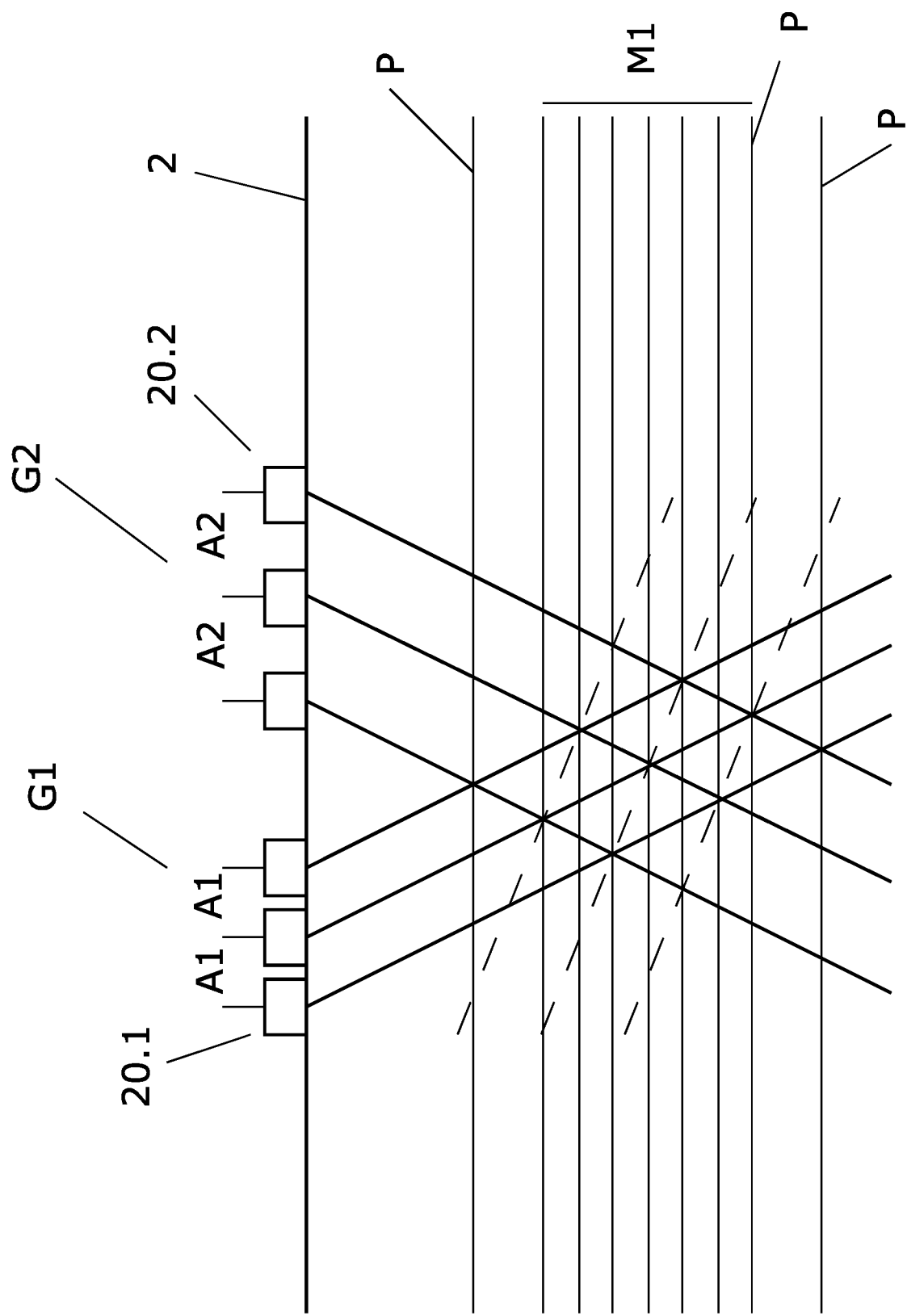
FIG. 3 shows a distribution of intersection points.

FIG. 3 shows a network of intersection points, which is created by a first group G1 of associated first ultrasonic transducers having three, first ultrasonic transducers 20.1 and a second group G2 of associated second ultrasonic transducers having three, second ultrasonic transducers 20.2. In the case of equally large separations A1 and A2, the network would have had the form of a diamond, wherein some intersection points exhibit an equal separation from a wall of the measuring tube 2. Due to the different separations A1 and A2, the diamond is distorted, thus forming a parallelogram, so that intersection points with in the other case equal separation from a measuring tube wall now are arranged along lines inclined to the measuring tube wall, such as indicated by means of the dashed lines. In the case of equal numbers N1 of first ultrasonic transducers of the first group G1 and N2 of second ultrasonic transducers of the second group G2, there lie on a central inclined line the number of intersection points corresponding to the number of first ultrasonic transducers, and on neighboring inclined lines, in each case, one intersection point less. For the case, in which for the separations A1 and A2 the following relationship holds: (a+1)*A1=a*A2 with b>a>1, with a and b being natural numbers and N1 and N2 being greater than or equal to a+1, then the intersection points of the central inclined line and at least the neighboring inclined lines lie on equidistant parallels to the measuring tube wall, or measuring tube axis, and define a greatest cardinality, first amount M1 of equidistant parallels. Other amounts of equidistant parallels are spaced from the amount M1 by a greater separation than the separation of neighboring equidistant parallels. An amount of equidistant parallels can also comprise only one parallel, which is parallel to and equidistant from itself.

The separations of the parallels for the ultrasonic transducers depends on a separation of the first group from the second group. A pushing of the second group toward the first group results in a lessening of the separations of the parallels for the ultrasonic transducers. This means that the arrangement can be applied for measuring tubes of small diameter.

The numbers of ultrasonic transducers, their arrangements relative to one another as well as the selected angles are not to be construed as limiting and are shown purely for purposes of illustration.

Figure 4:
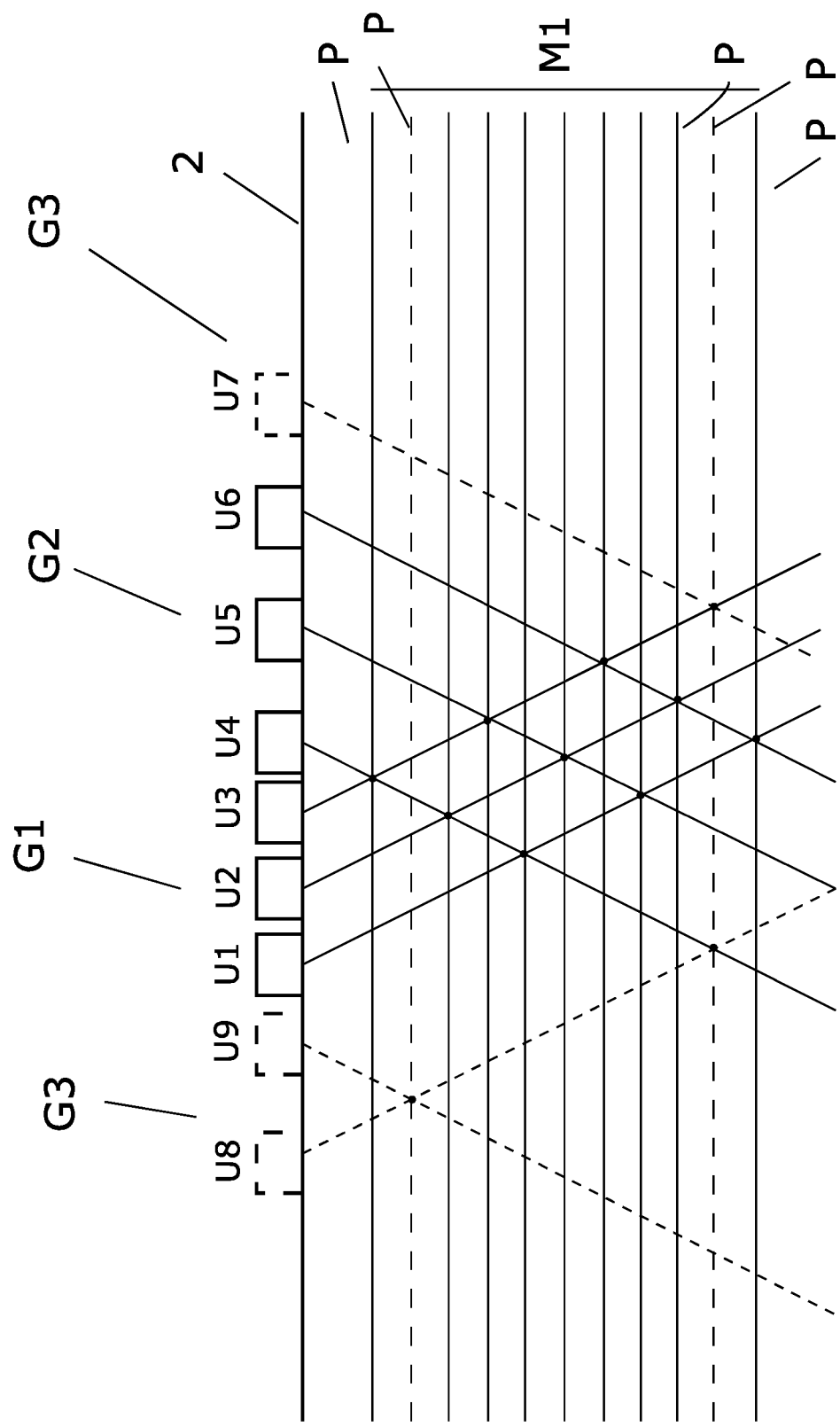
FIG. 4 shows options for supplementing a greatest cardinality, first amount of equidistant parallels.

FIG. 4 shows how the greatest cardinality, first amount M1 can be supplemented by adding further ultrasonic transducers. The first group G1 of ultrasonic transducers comprising the ultrasonic transducers U1 to U3 as well as the second group G2 of ultrasonic transducers comprising the ultrasonic transducers U4 to U6 define as in FIG. 3 a network of intersection points, wherein intersection points fall within a first amount M1 of equidistant parallels P, and wherein intersection points sit at parallels P, which do not belong to the amount M1. The gap between a parallel not belonging to the amount M1 and a parallel belonging to the amount M1 is a whole numbered multiple of neighboring parallels of the amount M1. By means of at least a third group G3 of ultrasonic transducers, for example, comprising the ultrasonic transducer U7 and/or the ultrasonic transducers U8 and U9, the amount M1 can be supplemented, such as shown by the dashed parallels.

Supplementation can also be accomplished with ultrasound transducer arrangements, in the case of which the first group of ultrasonic transducers and/or the second group of ultrasonic transducers have more than three ultrasonic transducers.

Figure 5:
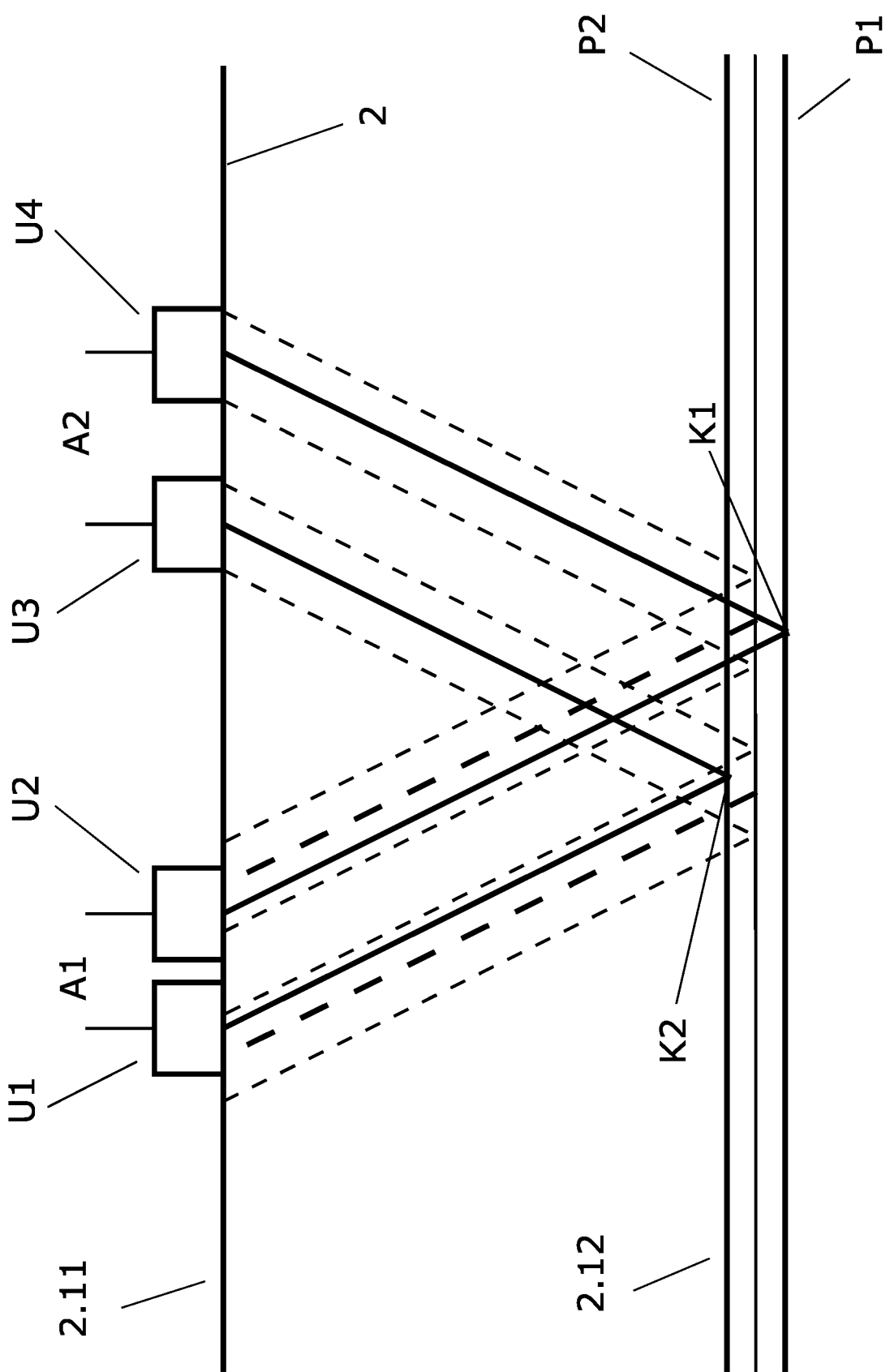
FIG. 5 shows different ultrasonic signal paths in a measuring tube as a function of a measuring tube diameter.

FIG. 5 shows ultrasonic signal paths depend on the measuring tube diameter. Ultrasonic signals, which are radiated into the measuring tube at a first side of the measuring tube 2.11, are reflected on a second side of the measuring tube 2.12 on an inside of the measuring tube wall. For the case in which the inside of the measuring tube on the second side coincides with a parallel P1, an ultrasonic signal path outgoing from a first ultrasonic transducer/second ultrasonic transducer superimposes on the ultrasonic signal path of a second ultrasonic transducer/first ultrasonic transducer, so that an ultrasonic signal outgoing from a first ultrasonic transducer/second ultrasonic transducer can be received by a second ultrasonic transducer/first ultrasonic transducer. Such is shown by the ultrasonic signal path between ultrasonic transducer U2 and ultrasonic transducer U4 by means of the solid line, which is reflected at the parallels P1 in the intersection point K1.

For the case in which the inside of the measuring tube on the second side does not coincide with a parallel P1, ultrasonic signal paths of the ultrasonic transducers U2 and 4 are offset from one another, this resulting in a lessened ultrasonic signal amplitude at the receiving ultrasonic transducer. Such is shown by the thick dashed line for an ultrasonic signal outgoing from U4.

For the case in which the inside of the measuring tube coincides on the second side with a parallel P2, the ultrasonic signal paths of the ultrasonic transducers U1 and U3 superimpose.

In case the inside of the second side of the measuring tube is between the parallels P1 and P2 and equally far from both parallels, a maximum relevant deviation of the inner wall from one of the parallels P1 and P2 is present. In case the inner wall would lie nearer P1, this would mean a better agreement of the ultrasonic signal paths of the ultrasonic transducers U2 and U4. In case the inner wall would lie nearer P2, this would mean a better agreement of the ultrasonic signal paths of the ultrasonic transducers U1 and U3. Such is demonstrated by means of the thin dashed lines going from U3 to U1 and outgoing from U4 to U2, which by neglecting a practically arising widening provides an ultrasonic signal width. In the case of reflection on the inner surface lying exactly halfway between P1 and P2, the ultrasonic signals no longer strike centrally on the corresponding receiving ultrasonic transducer but offset, wherein the offset is equally large in the case of both ultrasonic signal paths.

Preferably, the transducer elements have a radial extent rA (see FIG. 1), wherein $rA > 3/(8*a)*A1*\cos(\gamma)$ and, especially, $rA > 1/(4*a)*A1*\cos(\gamma)$, or $rA > 3/(8*a)*A1*\sin(\alpha)$ and, especially, $rA > 1/(4*a)*A1*\sin(\alpha)$, with $(a+1)*A1 = a*A2$.

Neglecting an ultrasonic signal expansion, a maximum relevant deviation, in this case, an offset, of an ultrasonic signal path in a direction extending along the measuring tube axis, or along a parallel P, of a third of an ultrasonic signal width in parallel with the measuring tube axis would result. It has been found that, in this case, an ultrasonic signal amplitude in a receiving ultrasonic transducer is still sufficient for good signal processing.

Figure 6:
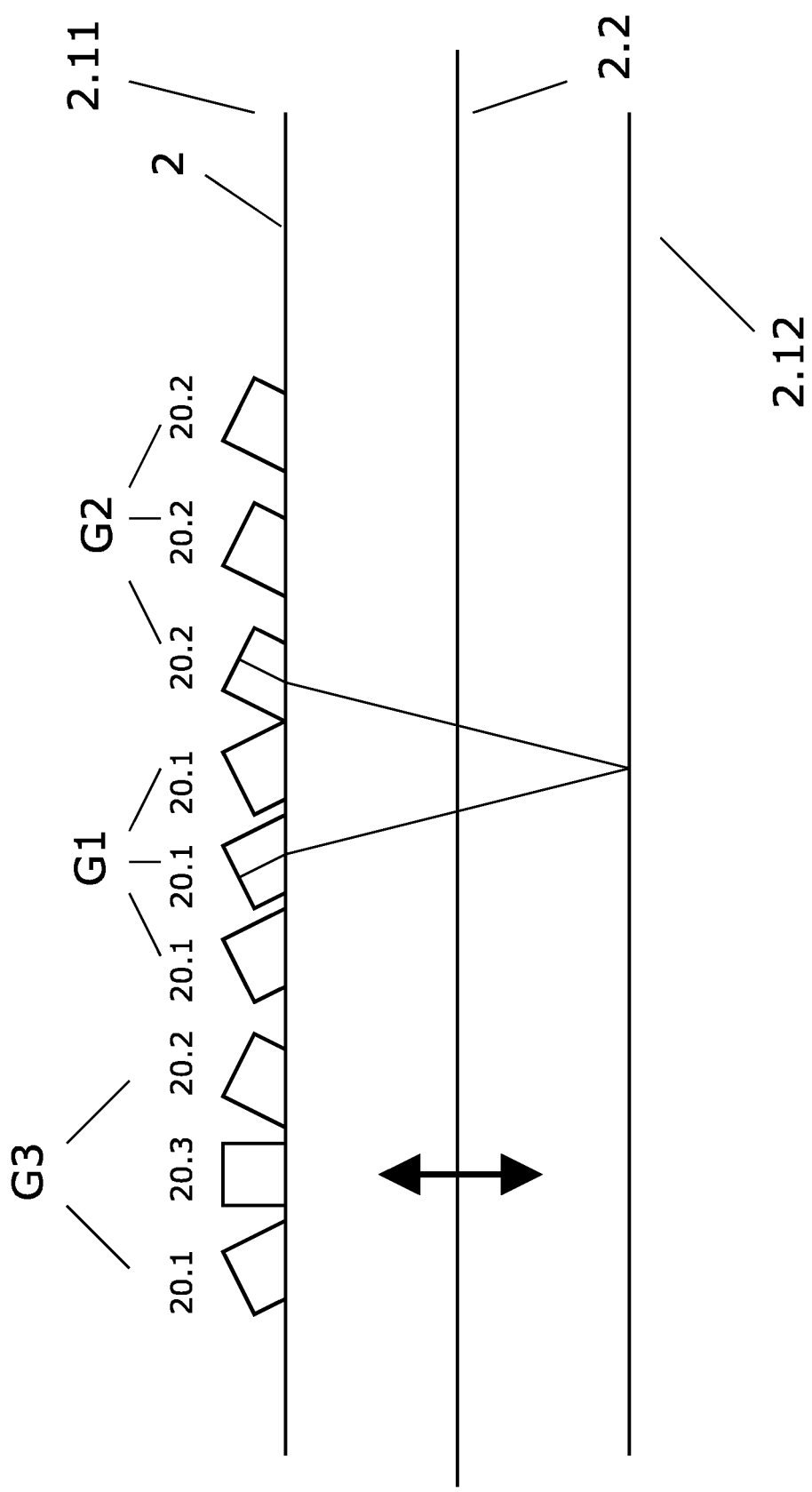
FIG. 6 shows by way of example, an arrangement of the present disclosure for ultrasonic transducers.

FIG. 6 shows, by way of example, an arrangement of the invention for ultrasonic transducers on a measuring tube 2, wherein a first group G1 of ultrasonic transducers as well as a second group G2 of ultrasonic transducers G2 have three first ultrasonic transducers 20.1 and three second ultrasonic transducers 20.2, respectively. Additionally, the arrangement includes a third group G3 of ultrasonic transducers having a first ultrasonic transducer 20.1 and a second ultrasonic transducer 20.2, by means of which the greatest cardinality amount of equidistant parallels such as shown in FIG. 4 is supplemented. Additionally, the ultrasonic transducer arrangement can, such as shown in this case, have a third ultrasonic transducer 20.3, which is adapted to radiate ultrasonic signals perpendicularly to the measuring tube axis and to receive these after reflection on the inside of the measuring tube on the second side 2.12. By means of at least one measured signal travel time of an ultrasonic signal, the measuring tube diameter and a measuring tube thickness can be determined as well as an ultrasonic transducer pair to be used. In such case, it can be utilized that on each interface between two different media reflections occur. Thus, a first reflection of an ultrasonic signal can be utilized for a thickness determination, and a second reflection for a measuring tube diameter determination. One skilled in the art can use known signal evaluation methods for this.

Figure 7:
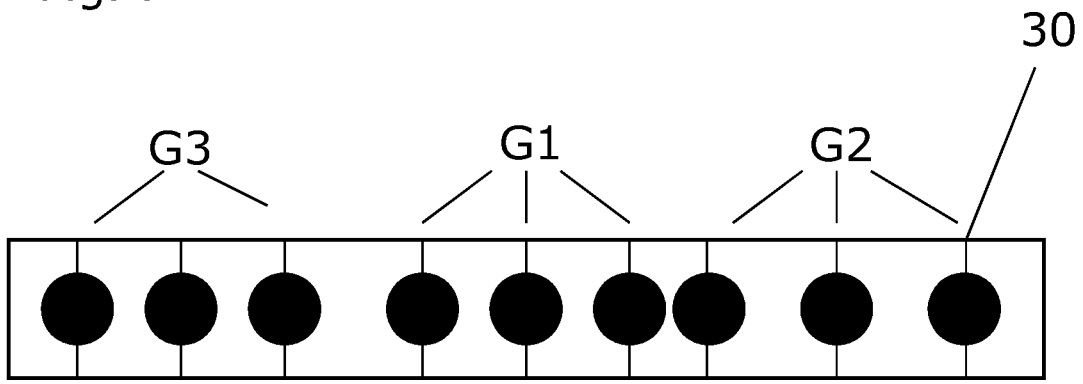
FIG. 7 shows an arrangement of ultrasonic transducers in a support body.

FIG. 7 shows ultrasonic transducers arranged in a support body 30 and held by such. The support body can have positioning elements, by means of which the ultrasonic transducers are positionable in a desired position in the case of installation in the support body. After positioning, the ultrasonic transducers can be potted in the support body. The ultrasonic transducers can, for example, be individually held in the support body, so that a fitting to, for example, a rough or uneven measuring tube surface is possible. The view is by way of example relative to the number and arrangement of the ultrasonic transducers and is not to be construed as limiting.

Figure 8:
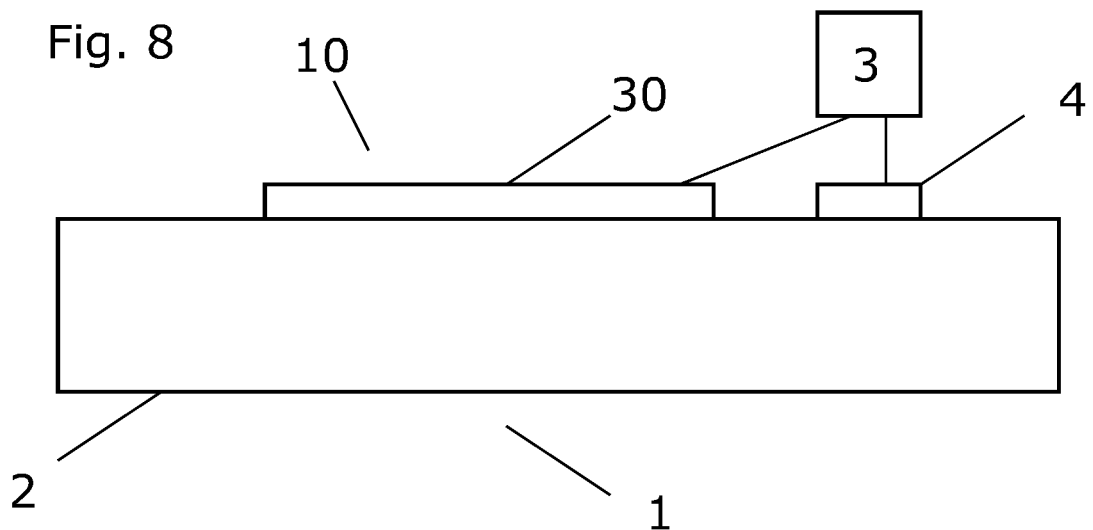
FIG. 8 shows a flow measuring point with an arrangement of ultrasonic transducers according to the present disclosure.

FIG. 8 shows by way of example a clamp-on ultrasonic, flow measuring point 1 having a measuring tube 2, an ultrasonic transducer arrangement 10 of the invention, a support body 30 for holding the ultrasonic transducer arrangement, a curvature sensor 4 for determining a measuring tube bend and an electronic measuring/operating circuit 3 for operating the ultrasonic transducer and the curvature sensor and for providing flow measured values. A clamp-on ultrasonic, flow measuring point does not have to have a curvature sensor.

Figure 9:
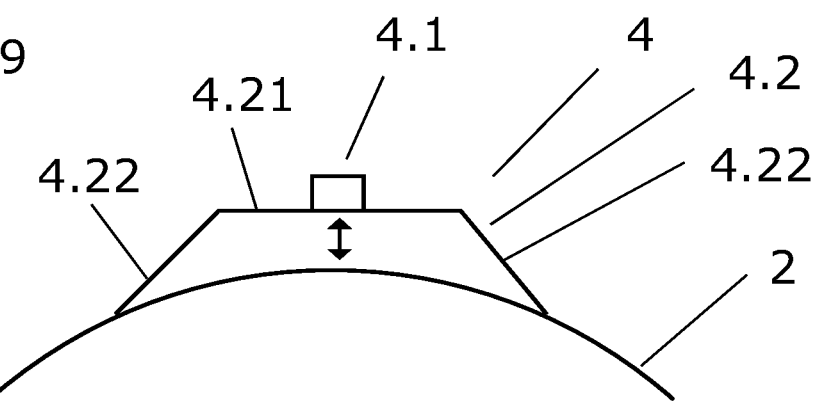
FIG. 9 shows a curvature sensor.

FIG. 9 shows a construction of a curvature sensor 4, by means of which a measuring tube outer diameter can be determined. With knowledge of the measuring tube outer diameter and a measuring tube thickness, an ultrasonic transducer pair to be used can be predetermined. A curvature sensor includes a separation sensor 4.1 and a spacer 4.2, which spacer has a central region 4.21 and two ends 4.22 bent from the central region. The spacer is placed on the measuring tube in parallel with a cross section of the measuring tube 2, wherein the central region has a measuring tube outer diameter dependent separation from a measuring tube outer surface. This separation is measured with the separation sensor 4.1 applied in the central region. Such a sensor can be, for example, an ultrasonic sensor or an optical sensor.

Instead of the V shaped ultrasonic signal paths shown in FIG. 5 having one reflection on the second measuring tube side 2.12, also W shaped signal paths with two reflections on the second measuring tube side and an intermediate reflection on the first measuring tube side 2.11 can be used. Such can be advantageous in the case of small measuring tube diameters or when measuring tube oscillations caused by ultrasonic signal incoupling are upon arrival at a receiving ultrasonic transducer superimposed as a function of time with ultrasonic signals, which travel along a V shaped ultrasonic signal path.

A start-up of the clamp-on ultrasonic, flow measuring point requires a determining of an ultrasonic transducer pair comprising a first ultrasonic transducer and a second ultrasonic transducer. To this end, such as already mentioned, a measuring tube inner diameter as well as a measuring tube thickness can be determined by means of a third ultrasonic transducer and, as a result, an ultrasonic transducer pair can be determined. Alternatively or supplementally, also such as already mentioned, a curvature sensor can be applied. Alternatively or supplementally, a plurality of first and/or second ultrasonic transducers can, simultaneously or offset in time, transmit ultrasonic signals. A selection of an ultrasonic transducer pair can then be determined, for example, based on ultrasonic signal amplitude, which is measured by means of ultrasonic transducers selected as receivers. For the purpose of figuring out which transducers are involved, one or more features can be impressed on the ultrasonic signals of different ultrasonic transducers applied for transmitting ultrasonic signals. For example, in the case of pulsed ultrasonic signals, a center frequency can be characteristic. Alternatively or supplementally, for example, ultrasonic signals can have different signal chirp.

At start-up, also a medium can be conveyed through the measuring tube and a travel time difference measurement of ultrasonic signals performed. In such case, ultrasonic signals without or with small travel time difference can be excluded from being taken into consideration. Such signals are, for example, signals, which are coupled from an original ultrasonic signal into the measuring tube, without traveling through the medium. In the case of a receiving ultrasonic transducer, thus, emanating from an original ultrasonic signal, a plurality of ultrasonic signals caused by various reflections can arrive superimposed or offset in time.

The invention claimed is:

1. An ultrasonic transducer arrangement for a clamp-on ultrasonic flow measuring point based on the travel time difference principle, the transducer arrangement comprising:
a plurality of ultrasonic transducers, each adapted to be arranged on an outside of a measuring tube of the clamp-on flow measuring point, wherein each ultrasonic transducer includes at least one transducer element configured to generate and/or receive ultrasonic signals and a coupling element, wherein the coupling element includes a first contact area and a second contact area, wherein the at least one transducer element is arranged on the first contact area, and wherein each ultrasonic transducer is adapted to contact the measuring tube via the respective second contact area,
wherein each ultrasonic transducer is configured to radiate ultrasonic signals into the measuring tube and/or to receive ultrasonic signals emerging from the measuring tube,
wherein the respective second contact areas each have a normal that defines a plane in which ultrasonic signal paths of the ultrasonic signals extend,
wherein the plurality of ultrasonic transducers include first ultrasonic transducers, which define first ultrasonic signal paths extending parallel with each other, and second ultrasonic transducers, which define second ultrasonic signal paths extending parallel with each other, wherein the first and second ultrasonic signal paths extend in the plane,
wherein the first ultrasonic signal paths and the second ultrasonic signal paths extend in the coupling element, in each case, inclined to the second contact area,
wherein a direction of the first ultrasonic signal paths and a direction of the second ultrasonic signal paths are mirror symmetric to one of the normals,
wherein the first ultrasonic signal paths form intersection points in the plane with the second ultrasonic signal paths, wherein the intersection points lie at parallels that extend in the plane perpendicular to the normals,
wherein a first group of associated, adjoining ultrasonic transducers includes exclusively the first ultrasonic transducers of a first number, and wherein a second group of associated, adjoining ultrasonic transducers includes exclusively the second ultrasonic transducers of a second number,
wherein the adjoining first ultrasonic transducers of the first group have in a direction of the parallels, in each case, a first separation, A1, from each other, and wherein the adjoining second ultrasonic transducers of the second group have in the direction of the parallels, in each case, a second separation, A2, from each other, wherein the first separation and the second separation are unequal,
wherein:

$$2*A1 \geq A2 \geq 1.125*A1.$$

2. The transducer arrangement of claim 1, wherein:

$$1.6*A1 \geq A2 \geq 1.125*A1.$$

3. The transducer arrangement of claim 1, wherein a relationship between the first separation and the second separation corresponds to the following equation:

$$(a+1)*A1 = a*A2$$

wherein a is a natural number that is greater than 1 and less than 9.

4. The transducer arrangement of claim 3, wherein a is greater than 1 and less than 5.

5. The transducer arrangement of claim 1, wherein each coupling element has a longitudinal axis that has an interior angle, α, relative to the corresponding second contact area, wherein the first as second ultrasonic signal paths extend in the coupling element in a direction of the longitudinal axis, wherein the at least one transducer element has a radial extent, rA, wherein:

$$rA > 3/(8*a)*A1*\sin(a).$$

6. The transducer arrangement of claim 5, wherein:

$$rA > 1/(4*a)*A1*\sin(a).$$

7. The transducer arrangement of claim 1, further comprising at least a third group of associated ultrasonic transducer including at least one first ultrasonic transducer and/or at least one second ultrasonic transducer,
wherein at least one intersection point formed with a first ultrasonic transducer of the third group and/or a second ultrasonic transducer of the third group supplements a greatest cardinality, first set of equidistant parallels.

8. The transducer arrangement of claim 1, wherein the plurality of ultrasonic transducers include a third ultrasonic transducer, which defines a third ultrasonic signal path extending perpendicular to the second contact area of the respective coupling element.

9. The transducer arrangement of claim 1, further comprising a support body configured to position and hold the plurality of ultrasonic transducers.

10. The ultrasonic transducer arrangement of claim 9, wherein each of the plurality of ultrasonic transducers are held individually in the support body.

11. A clamp-on ultrasonic flow measuring point for measuring a flow velocity of a medium flowing through a measuring tube, the measuring point comprising:
a measuring tube adapted to convey a medium and having a measuring tube axis;
an ultrasonic transducer arrangement as claimed in claim 1, wherein the ultrasonic transducer arrangement is oriented in parallel with the measuring tube axis; and
an electronic circuit configured to operate the plurality of ultrasonic transducers and to determine and provide measured values of a flow velocity of the medium.

12. The clamp-on ultrasonic flow measuring point of claim 11, further comprising a curvature sensor configured to determine an outer diameter of the measuring tube, the curvature sensor including a separation sensor and a spacer, wherein the spacer has a central region and two ends adjoining the central region, wherein the ends are bounded from the central region by a bend or an angle, wherein the spacer is configured via the ends to contact the measuring tube, wherein the central region is adapted to be spaced from the measuring tube, and wherein a cross-section or longitudinal section through the spacer through the two ends is configured to extend in parallel with a measuring tube cross-section, wherein the separation sensor is arranged on the spacer in the central region, and wherein the electronic circuit is configured to operate the separation sensor.

13. The clamp-on ultrasonic flow measuring point of claim 12, wherein the separation sensor is an optical or acoustic separation sensor.

14. A method for commissioning the clamp-on ultrasonic flow measuring point as claimed in claim 11, the method comprising:

transmitting, simultaneously or offset in time, first ultrasonic signals and second ultrasonic signals from each of the first ultrasonic transducers and second ultrasonic transducers, respectively;

receiving the transmitted first and second ultrasonic signals by the second ultrasonic transducers and the first ultrasonic transducers, respectively; and determining at least one ultrasonic transducer pair of the first and second ultrasonic transducers to be used for a measurement operation based on a signal strength and/or a signal-noise ratio of the received first and second ultrasonic signals using the electronic circuit.

15. The method of claim 14, wherein the first and second ultrasonic signals are quasi-continuous and differ in frequency, or wherein the transmitted first and second ultrasonic signals are pulsed and differ in a center frequency of a frequency spectrum.

16. The method of claim 14, further comprising:

conveying the medium through the measuring tube;

examining portions of the received first and second ultrasonic signals for presence of a travel time difference; and excluding portions of the received first and second ultrasonic signals without travel time difference in determining the at least one ultrasonic transducer pair to be used for the measurement operation.

17. The method of claim 14, wherein the plurality of ultrasonic transducers of the ultrasonic transducer arrangement of the clamp-on ultrasonic flow measuring point further includes a third ultrasonic transducer, which defines a third ultrasonic signal path extending perpendicular to the second contact area of the respective coupling element, the method further comprising:

transmitting and receiving the third ultrasonic signal via the third ultrasonic transducer;

determining an outer diameter and/or inner diameter of the measuring tube based on at least one signal characteristic of the received third ultrasonic signal using the electronic circuit.

18. The method of claim 14, wherein the clamp-on ultrasonic flow measuring point further comprises a curvature sensor configured to determine an outer diameter of the measuring tube, the curvature sensor including a separation sensor and a spacer, wherein the spacer has a central region and two ends adjoining the central region, wherein the ends are bounded from the central region by a bend or an angle, wherein the spacer is configured via the ends to contact the measuring tube, wherein the central region is adapted to be spaced from the measuring tube, and wherein a cross-section or longitudinal section through the spacer by the two ends is configured to extend in parallel with a measuring tube cross-section, wherein the separation sensor is arranged on the spacer in the central region, and wherein the electronic circuit is configured to operate the separation sensor, the method further comprising determining an outer diameter of the measuring tube using the electronic circuit based on the curvature sensor.

\* \* \* \* \*